Figure 1:
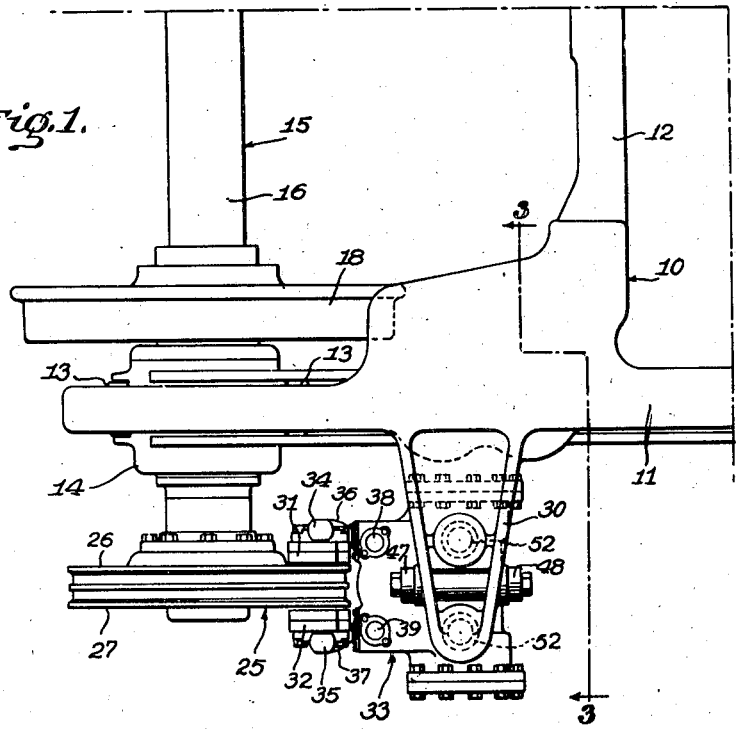

Nov. 5, 1946.  C. L. EKSERGIAN  2,410,574

BRAKE ARRANGEMENT

Filed Jan. 19, 1944   2 Sheets-Sheet 1

INVENTOR,
Carolus L. Eksergian
BY
John P. Barbry
ATTORNEY

Nov. 5, 1946.  C. L. EKSERGIAN  2,410,574
BRAKE ARRANGEMENT
Filed Jan. 19, 1944  2 Sheets-Sheet 2
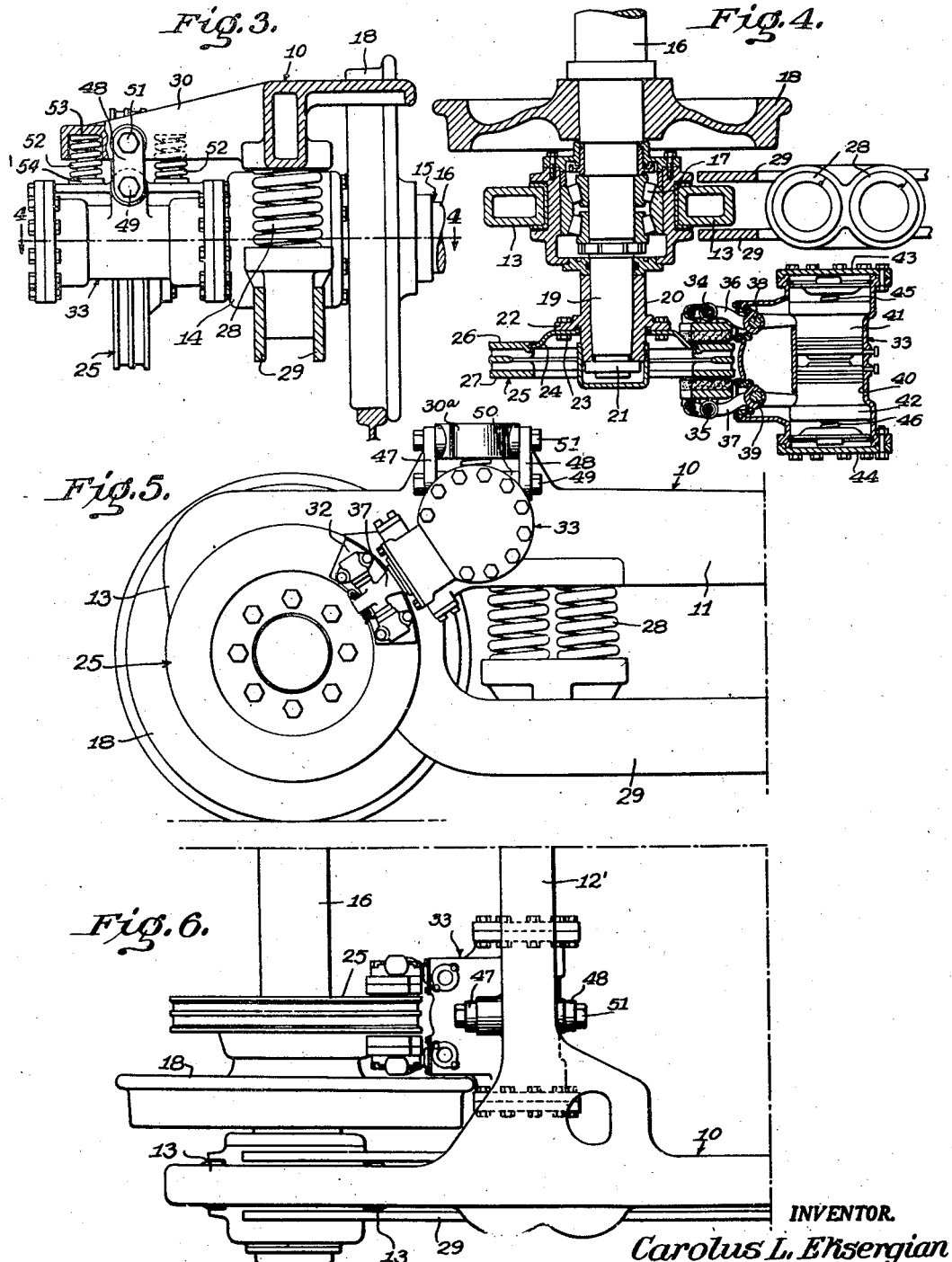
INVENTOR.
Carolus L. Eksergian
BY
John P. Tarbox
ATTORNEY Patented Nov. 5, 1946

2,410,574

UNITED STATES PATENT OFFICE 2,410,574

BRAKE ARRANGEMENT

Carolus L. Eksergian, Detroit, Mich., assignor to The Budd Company, Philadelphia, Pa., a corporation of Pennsylvania Application January 19, 1944, Serial No. 518,826

2 Claims. (Cl. 188—153)

The invention relates to a brake mechanism and particularly to a brake mechanism for vehicles, such as railway trucks.

It is among the objects of the invention to simplify such brake mechanisms and to arrange the mechanism so that it is readily accessible and readily mounted and demounted from the vehicle frame.

Another object of the invention is to mount the brake mechanism including the non-rotary elements of the brake and its actuating means as a unitary structure on the vehicle frame so that it is free to follow the movements of the rotary element with which it cooperates under all conditions of relative movement between the frame and the wheel and axle assembly supporting it.

Another object of the invention is to mount the brake mechanism unit on the frame so that the torque force exerted on the frame in a vertical direction is diminished over that of the usual arrangement, thereby lessening the effect of the braking on the spring suspension.

These objects are attained by the specific embodiments shown in the appended drawings and described in detail in the following detailed description forming a part of this specification, although it will be understood that changes may be effected from the specific embodiments shown without departing from the main features of the invention.

Figure 2:
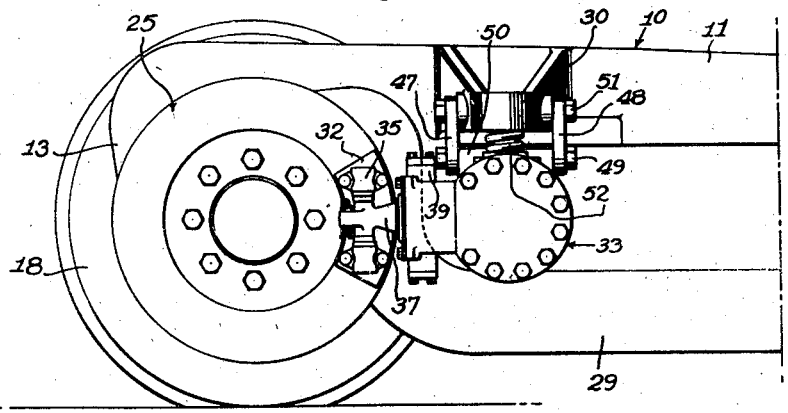

In the drawings:

Fig. 1 is a plan view of one quarter of a rail car truck equipped with the brake mechanism of the invention, it being understood that the other quarters of the truck may be similarly arranged, Fig. 2 is a side elevational view, Fig. 3 is a vertical transverse sectional view taken substantially on the line 3—3 of Fig. 1 parts being broken away to more clearly show the brake mechanism mounting, Fig. 4 is a horizontal sectional view taken substantially on the line 4—4 of Fig. 3, Fig. 5 is a view similar to Fig. 2, showing a modification, and Fig. 6 is a plan view similar to Fig. 1 showing a further modification.

In the drawings, the brake mechanism of the invention is shown applied to a vehicle of the railway truck type, although in its broader aspects, it is obviously useful in other relations than the specific relation shown. According to the arrangement shown in Figs. 1 to 5 the brake mechanism is mounted entirely outside the truck frame, so that the parts are most readily accessible.

The truck frame is represented by the numeral 10 and may comprise the usual side frame members, as 11, interconnected by transoms, as 12. The side frame members may have the usual end pedestals 13 guided for vertical movement on the adjacent journal boxes, as 14, on the adjacent wheel and axle assembly, designated generally by the numeral 15.

The wheel and axle assembly comprises, in addition to the journal boxes, as 14, the axle 16 rotatably mounted therein, as through an anti-friction bearing 17, and the wheels, as 18, mounted as usual at the opposite ends of the axle to rotate therewith. The axle 16 has an extension 19 beyond the axle box with which the rotary element of the brake mechanism is shown associated.

As shown, a flanged hub 20 is non-rotatably clamped upon the tapered extension 19 of the axle as by a nut 21 screwed onto the reduced screw-threaded end thereof. To the flange 22 of this hub 20 is removably secured, as by bolts 23, the support web 24 of a ventilated brake ring or disc 25 having radial braking faces 26 and 27 on the opposite faces thereof. Such brake ring or disc may be similar to that shown in Patent No. 2,233,594, issued March 4, 1941.

The truck frame 10, as shown, is yieldingly supported, as by coil springs 28, on the equalizer bars as 29, the upwardly offset ends of which rest in a usual manner on the associated journal boxes 14.

According to the invention the non-rotary brake members and the actuating means therefor associated with the rotary brake disc or ring 25 are carried by a mounting portion on the truck frame. In the forms shown in Figs. 1 to 4, this mounting portion comprises a lateral extension 30 on the truck side frame 11 in a region adjacent the associated brake ring.

The non-rotary brake members are shown as a pair of segmental shoes 31 and 32 arranged to cooperate with the radial braking faces 26 and 27, respectively, of the associated rotary brake ring 25. Preferably they are carried by a support designated generally by the numeral 33 which is movably and readily removably supported from the mounting extension 30 of the frame.

Such support for the shoes preferably comprises a closed cylinder housing enclosing most of the movable parts of the brake mechanism cooperating with the rotary brake ring associated therewith.

The shoes 31 and 32 are pivotally supported at 34 and 35, respectively, upon respective brake levers 36 and 37 which are pivoted intermediate their ends at 38 and 39, respectively, within the cylinder housing support 33. The arms of the levers 36 and 37 opposite the arms supporting the shoes are extended within the cylinder 40 of the housing support 33 and into cooperative relation to the respective pistons 41 and 42 movable in the cylinder. The ends of the cylinder are closed by removable heads 43 and 44 and springs, as 45 and 46, return the pistons and shoes to their inoperative positions. A usual port (not shown) is provided in the cylinder wall to admit fluid under pressure between the pistons to force them apart and apply the brakes.

The arrangement of the cylinder housing support is generally similar to that shown in copending application, Serial No. 399,779 filed June 26, 1941, and need not be further described herein. To support the cylinder housing support movably and removably from the mounting extension 30, it is suspended therefrom by fore and aft spaced links 47 and 48. The lower ends of these links are secured centrally of the cylinder housing by a bolt 49 passing through openings therein and in a lug 50 on the cylinder housing between the links. Similarly the upper ends of the links are secured to the opposite sides of the mounting extension 30 by a bolt 51. The bolted connections are such as to permit swinging of the links. Thus the cylinder housing support can be readily removed and replaced by removing or replacing one or the other of the bolts 49 or 51.

The link suspension is desirable also to allow lateral floating of the support and to allow tilting thereof, so that the shoes may at all times follow the movement of the axle relative to the frame. It is desirable, however, to normally maintain the shoes equally spaced from the adjacent faces of the disc and to this end, yielding means are provided between the cylinder housing support 33 and the mounting extension 30 to normally maintain the shoes in this centered relation, yet permitting them to follow the movements of the disc when the brakes are applied.

Such yielding means may comprise similar coil springs 52 arranged at equal distances on the opposite sides of the link suspension, see Fig. 3, and retained in place by suitable seats engaging their ends. The arrangement shown comprises a recess 53 in the mounting extension 30 in which the upper end of a spring is seated. Its lower end may slidingly engage the cylinder support 30 through a headed guide plug, as 54.

This arrangement provides for a very simple construction in which the brake parts are at all times readily accessible, and in which they can be readily mounted on and demounted from the truck. The flexible mounting of the support housing at the same time permits the shoes at all times to follow the relative movements of the axle and frame, which is an important consideration where the shoes are mounted on the truck frame.

In the mounting shown in Figs. 1 to 4, the braking torque, in view of the horizontal arrangement of the brake levers, and their mounting on vertical pivots in the cylinder housing support 33, has a strong vertical reaction and therefore affects the springing of the truck frame when the brakes are applied. To minimize this effect, the arrangement shown in Fig. 5 may be employed. According to this arrangement, the brake cylinder housing support is suspended from the frame extension 30a at an angle to the horizontal. As clearly appears, the segmental shoes, as 32, engage the disc above the axis of the axle and the brake levers, as 36 and 37, are arranged in a transverse plane inclined to the horizontal plane through the axle. With this arrangement it will be obvious that the braking torque transmits to the frame a substantial horizontal component and materially decreases the vertical component, so that the springing of the frame is less affected by this modified arrangement than with the arrangement shown in Figs. 1 to 4.

The embodiment shown in Fig. 6 shows the invention applied to a brake mechanism arranged inside the wheel, the more orthodox arrangement. While this arrangement makes the parts somewhat less accessible than the embodiments already described, it has the advantage of a more compact truck and brake arrangement. In this form corresponding parts are given corresponding reference numerals. According to this arrangement a transom 12' of the truck frame 10 is arranged in close adjacency to the brake disc 25 mounted on the inside face of the adjacent wheel in a usual manner, and the brake cylinder housing 33 is mounted on the transom 12' in the same manner in which it has been described as mounted on the lateral extension 30 or 30a of Figs. 1 to 5. It is obvious that the inclined mounting shown in Fig. 5 could also be used in this modification, if desired.

While several modifications embodying the invention have been described herein in detail, it will be understood that changes and modifications may be made without departing from the main features of the invention, and all such changes and modifications are intended to be covered by the claims appended hereto.

What is claimed is:

1. In a vehicle brake arrangement, a vehicle frame, a wheel and axle assembly supporting it and embodying spaced braking faces rotating with a wheel of said assembly, brake shoes arranged to operatively engage the respective braking faces, a mounting portion on said frame adjacent the peripheries of said braking faces, a removable support for said shoes, and means for removably carrying said support solely by said mounting portion of the frame and comprising spaced links extending between said mounting portion and said support and articulated to each so as to permit lateral movement of said support, resilient means for normally holding said support centered with respect to said braking faces, said support carrying a brake cylinder and a pair of brake levers operatively interconnecting said cylinder and the respective shoes, said support being carried by the mounting portion of said frame so that the lever axes are arranged in a transverse plane substantially inclined to the horizontal plane through the axle of said assembly, whereby a substantial component of the braking torque is transmitted to said frame in a direction longitudinally thereof.

2. In a vehicle brake arrangement, a vehicle frame, a wheel and axle assembly supporting it and embodying a radial braking face rotating with a wheel of said assembly, a brake element arranged to operatively engage said braking face, a mounting portion on said frame adjacent the periphery of said braking face, a removable support for said brake element, and means for removably carrying said support solely by said mounting portion of the vehicle frame, said support carrying a brake cylinder for actuating said brake element and a brake lever operatively interconnecting said cylinder and element, said support being carried by the mounting portion of the vehicle frame so that the lever axis is arranged in a transverse plane substantially inclined to the horizontal plane through the axle of said assembly, whereby a substantial component of the braking torque is transmitted to the frame in a direction longitudinally thereof.

CAROLUS L. EKSERGIAN.